(12) United States Patent
Nishikawa

(10) Patent No.: US 6,373,634 B1
(45) Date of Patent: Apr. 16, 2002

(54) MICROLENS ARRAY, A MANUFACTURING METHOD THEREFOR, AND A DISPLAY DEVICE USING THE MICROLENS ARRAY

(75) Inventor: Takao Nishikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/428,265

(22) Filed: Oct. 27, 1999

(30) Foreign Application Priority Data

Oct. 28, 1998 (JP) .......................................... 10-322866

(51) Int. Cl.⁷ .......................... G02B 27/10; G03B 21/56
(52) U.S. Cl. ........................ 359/619; 359/621; 359/455
(58) Field of Search .............................. 359/619, 620, 359/621, 622, 623, 624, 455, 542

(56) References Cited

U.S. PATENT DOCUMENTS

| | | | | |
|---|---|---|---|---|
| 4,859,027 A | * | 8/1989 | Kishida | 359/455 |
| 5,230,990 A | * | 7/1993 | Iwasaki et al. | 430/321 |
| 5,448,401 A | * | 9/1995 | Takuma et al. | 359/456 |
| 5,687,024 A | * | 11/1997 | Yoshimura et al. | 359/455 |
| 5,764,323 A | * | 7/1998 | Fukuda | 349/95 |
| 5,933,276 A | * | 8/1999 | Magee | 359/619 |
| 6,101,031 A | * | 8/2000 | Yoshimura et al. | 359/456 |
| 6,157,491 A | * | 12/2000 | Watanabe et al. | 359/619 |
| 6,169,633 B1 | * | 1/2001 | Watanabe | 359/626 |
| 6,185,038 B1 | * | 2/2001 | Yamaguchi et al. | 359/457 |

FOREIGN PATENT DOCUMENTS

| | | | | |
|---|---|---|---|---|
| JP | 3-198003 | | 8/1991 | |
| JP | 02000131505 A | * | 5/2000 | G02B/3/00 |

* cited by examiner

Primary Examiner—Georgia Epps
Assistant Examiner—Saeed Seyrafi
(74) Attorney, Agent, or Firm—Mark P. Watson

(57) ABSTRACT

A microlens array produced using a simple manufacturing method increases screen brightness in a display apparatus using the microlens array. The manufacturing method forms a light transmitting layer 30 from a light transmitting layer precursor 32 by pressing together a first master 10 and a second master 20 with the light transmitting layer precursor 32 disposed between the first and second masters. The first master 10 has a plurality of first curved surfaces 12, and the second master 20 has a plurality of second curved surfaces 22. The resulting light transmitting layer 30 has on both sides thereof a plurality of first and second lens surfaces 34, 36 formed in the light transmitting layer precursor 32 by the first and second curved surfaces 12, 22 on the masters.

14 Claims, 10 Drawing Sheets

$na > nb$
$nc > nb$

MICROLENS ARRAY, A MANUFACTURING METHOD THEREFOR, AND A DISPLAY DEVICE USING THE MICROLENS ARRAY

BACKGROUND OF THE INVENTION

1. Field of the Invention

The present invention relates to a microlens array, to a manufacturing method for the microlens array, and to a display device using the microlens array.

2. Description of the Related Art

Microlens arrays comprising a large number of very small lenses arranged in an ordered pattern have been used in liquid crystal display (LCD) panels and other applications. Using a microlens array in an LCD panel makes it possible for each lens to focus incident light on an individual pixel, and thereby achieve a bright display.

Microlens arrays can be manufactured using dry etching and wet etching methods. A drawback to both dry and wet etching methods is the need for a lithography step in the production of each microlens array, thus increasing manufacturing cost.

To resolve this problem, Japan Unexamined Patent Application Publication (kokai) 3-198003 teaches a method for manufacturing a microlens array without using a lithography step. This method uses a master having formed thereon curved surfaces corresponding to each of the lenses in the microlens array. A resin is then deposited on this master, set, and removed from the master to obtain the microlens array.

While the microlens array is used to achieve a brighter display screen, the light gathering power of each lens is not always sufficient. It is therefore desirable to further increase screen brightness.

OBJECTS OF THE INVENTION

Therefore, it is an object of the present invention to overcome the aforementioned problems.

With consideration for this problem, an object of the present invention is to provide a microlens array achieving a brighter display screen.

A further object of the present invention is to provide a method for manufacturing this microlens array.

Another object of the present invention is to provide a display device using a microlens array according to the present invention.

SUMMARY OF THE INVENTION

To achieve the above objects, a microlens array manufacturing method according to the present invention comprises a step for forming a light transmitting layer from a light transmitting layer precursor by pressing together a first master and a second master with the light transmitting layer precursor disposed between the first and second masters. The first master has a plurality of first curved surfaces, and the second master has a plurality of second curved surfaces. The resulting light transmitting layer has on both sides thereof a plurality of lens surfaces formed in the light transmitting layer precursor by the first and second curved surfaces on the masters.

By thus compressing a light transmitting layer precursor between first and second masters, the curved surfaces formed on the surfaces of the first and second masters are transferred to the light transmitting layer precursor to form lens surfaces. A microlens array having a plurality of lens surfaces on both sides can thus be easily manufactured.

With a microlens array thus having lenses on two sides, incident light is gathered twice, thereby achieving a brighter display.

Furthermore, once manufactured, the first and second masters can be reused multiple times insofar as their durability allows. The steps for manufacturing the microlens array masters can thus be omitted for second and subsequent microlens arrays, thereby reducing the number of production steps and production cost.

In this exemplary manufacturing method, the first and second masters are preferably positioned with respect to each other with the center axis of each first curved surface aligned with the center axis of a corresponding second curved surface, and the masters are then pressed together with the light transmitting layer precursor disposed therebetween.

By thus aligning the masters, the center axes of corresponding lens surfaces are aligned in the resulting microlens array.

Yet further preferably, a second light transmitting layer is formed from a second light transmitting layer precursor on at least one side of the first light transmitting layer.

This second light transmitting layer forms a protective layer over the lens surfaces on the side of the first light transmitting layer to which it is formed. The interface between the first light transmitting layer and this second light transmitting layer then becomes the lens surface.

Yet further preferably, the second light transmitting layer is formed by compressing the second light transmitting layer precursor between the first light transmitting layer and a third master. This third master has raised parts forming a plurality of areas between the raised parts so that recessed parts are formed from the raised parts in the second light transmitting layer. This microlens array manufacturing method further comprises: a step for separating the third master from the second light transmitting layer; and a step for forming a light shield layer by filling the recessed parts in the second light transmitting layer with a light shield material.

A microlens array obtained by this manufacturing method further comprises a light shield layer formed by filling recesses transferred to the second light transmitting layer from raised parts (i.e. projections) in the third master with a light shield material. This light shield layer forms a black matrix whereby contrast between adjacent pixels can be improved.

A microlens array manufactured according to this exemplary method of the present invention achieves a bright screen and improves image contrast, and can be easily manufactured with a simple transfer molding process.

Yet further preferably, in the step for forming the second light transmitting layer in this method, the third master is aligned so that the center axis of each lens surface formed in the light transmitting layer is surrounded by raised parts of the third master.

By thus positioning the third master, the recesses transferred to the second light transmitting layer from the convex parts of the third master are formed to surround the center of each lens surface. As a result, a black matrix is formed away from the lens surface centers.

A microlens array manufacturing method according to the present invention further preferably comprises a step for forming a light shield layer by filling with a light shield material recessed parts of a third master having recessed parts defining a plurality of areas; and a step for separating the third master from the light shield layer and second light transmitting layer. In this case the step for forming a second light transmitting layer compresses the second light transmitting layer precursor between the first light transmitting layer and this third master after the recesses therein are filled with the light shield material.

A microlens array thus comprised has a light shield layer formed by the light shield material filled into the recesses in the third master such that the light shield layer is molded integrally with a light transmitting layer. This light shield layer forms a black matrix whereby contrast between pixels can be improved.

A microlens array manufactured according to this exemplary method of the present invention achieves a bright screen and improves image contrast, and can be easily manufactured with a simple transfer molding process.

Yet further preferably in this case, the third master is aligned so that the center axis of each lens surface formed in the light transmitting layer is surrounded by recessed parts of the third master in the step for forming the second light transmitting layer in this method.

By thus positioning the third master, the light shield layer formed in the recessed parts of the third master is aligned so that the center of each lens surface is surrounded by light shield material. As a result, a black matrix is formed away from the lens surface centers.

In a manufacturing method according to the present invention, the recessed parts are preferably filled with light shield material using an ink jet method.

Ink jet methods enable the light shield material to be injected into the recesses quickly and without waste.

Yet further preferably, the above methods of the present invention further comprise a step for forming a third light transmitting layer over the light shield layer.

This third light transmitting layer covers and protects the light shield layer, and smoothes the surface on which the light shield layer is formed.

The present invention further relates to a microlens array manufactured using any of the methods of the present invention.

A microlens array according to the present invention further relates to a microlens array having a light transmitting layer with a plurality of first lens surfaces formed on one side thereof, and a second lens surface aligned with an optical axis of each first lens surface formed on the other side of the light transmitting layer.

A microlens array according to the present invention thus has lenses on two sides formed so that light incident upon lenses on one side is gathered twice, thereby achieving a brighter screen.

Yet further preferably, a microlens array according to the present invention comprises a second light transmitting layer on at least one side of the above-noted light transmitting layer.

This second light transmitting layer forms a protective layer over the lens surfaces on the side of the first light transmitting layer to which it is formed. The interface between the first light transmitting layer and this second light transmitting layer then becomes the lens surface.

Yet further preferably, a microlens array according to the present invention additionally comprises a light shield layer formed on at least one side of the light transmitting layer so that the center axis of each lens surface is surrounded by the light shield material of the light shield layer.

The resulting light shield layer surrounding the lens centers forms a black matrix, thus improving contrast between pixels.

The present invention further relates to a display apparatus comprising a microlens array according to the present invention, and a light source for emitting light to the microlens array.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

The preferred embodiments of the present invention are described below with reference to the accompanying figures.

Embodiment 1

A microlens array manufacturing method according to a first preferred embodiment of the present invention is described below with reference to FIG. 1A to FIG. 3B.

Figure 1A:
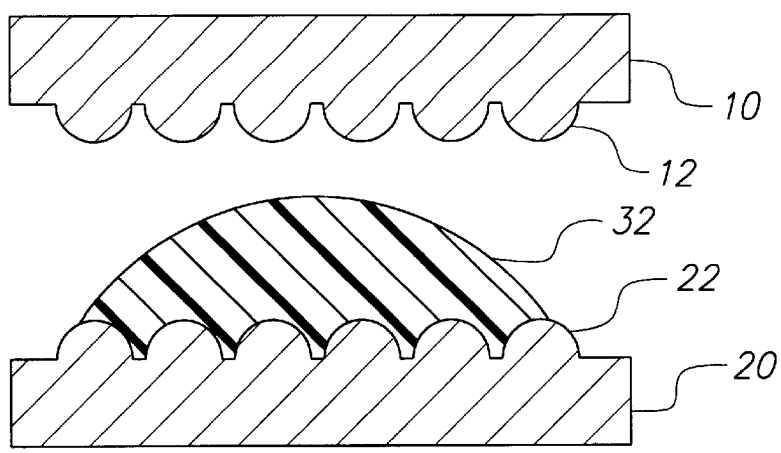
FIG. 1A to FIG. 3B show various steps in a microlens array manufacturing method according to a first preferred embodiment of the present invention.

The first step is to prepare a first master 10 and second master 20 as shown in FIG. 1A. A plurality of first curved surfaces 12 is formed on the surface of the first master 10. These first curved surfaces 12 have a convex shape with a surface profile that is the inverse of the pattern of concave lenses to be formed therefrom. A plurality of second curved surfaces 22 is likewise formed on the surface of the second master 20. These second curved surfaces 22 also have a convex shape with a surface profile that is the inverse of the pattern of concave lenses to be formed therefrom.

The first and second masters 10 and 20 can be formed by etching the surface of a substrate. Any etchable material can therefore be used for the masters, but a silicon or quartz material is preferable because of the ease with which high precision convex surfaces comprising a plurality of raised parts (i.e. projections) 12 and 22 can be formed by etching.

The masters 10 and 20 are then placed opposite each other with the centers of corresponding curved surfaces 12 and 22 aligned.

The masters 10 and 20 are then pressed together with a first light transmitting layer precursor 32 disposed therebetween. This light transmitting layer precursor 32 becomes the first light transmitting layer 30 shown in FIG. 1B. It should be noted that while the first master 10 is shown on top in FIG. 1A, the masters can be alternatively positioned with the second master 20 on top.

The light transmitting layer precursor 32 can be substantially any transparent material, but is preferably a material such as an energy-setting resin that can be set by applying energy. Such materials can be handled as low viscosity fluids when molding the light transmitting layer 30, and can be easily filled to the smallest areas between the curved surfaces 12 and 22 of the masters 10 and 20 at approximately room temperature and pressure conditions.

Energy-setting resin as used herein means a resin that can be set by the application of either light or heat. By using a photosetting or thermosetting resin, widely available exposure systems, baking ovens, hot plates, and other heating devices can be used, thereby helping to reduce and minimize equipment costs.

Exemplary energy-setting resins include: acrylic resins, epoxy resins, melamine resins, and polyimide resins. Acrylic resins in particular are desirable because a wide range of commercially available precursors and photosensitizers (photopolymerization initiators) can be used and the resin can be set in a short time by exposure to light.

Specific examples of the basic composition of a photosetting acrylic resin include prepolymers, oligomers, monomers, and photopolymerization initiators.

Exemplary prepolymers and oligomers include: acrylates such as epoxy acrylate, urethane acrylate, polyester acrylate, polyether acrylate, and spiroacetal acrylate; and methacrylates such as epoxy methacrylate, urethane methacrylate, polyester methacrylate, and polyether methacrylate.

Exemplary monomers include: monofunctional monomers such as 2-ethylhexyl acrylate, 2-ethylhexyl methacrylate, 2-hydroxyethyl acrylate, 2-hydroxyethyl methacrylate, n-vinyl-2-pyrrolidone, Carbitol acrylate, tetrahydrofurfuryl acrylate, isobornyl acrylate, dicyclopentenyl acrylate, and 1,3-butanediol acrylate; bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate; and polyfunctional monomers such as trimethylolpropane triacrylate, trimethylolpropane trimethacrylate, pentaerythritol triacrylate, and dipentaerythritol hexacrylate.

Exemplary photopolymerization initiators include: acetophenone compounds such as 2,2-dimethoxy-2-phenyl acetophenone; butyl phenone compounds such as α-hydroxy isobutyl phenone and p-isopropyl-α-hydroxy isobutyl phenone; halogenated acetophenone compounds such as p-tert-butyl dichloro acetophenone, p-tert-butyl trichloro acetophenone, and α,α-dichlor-4-phenoxy acetophenone; benzophenone compounds such as benzophenone [diphenyl ketone], and n,n-tetraethyl-4,4-diamino benzophenone; benzyl compounds such as benzyl, and benzyldimethyl ketal; benzoin compounds such as benzoin and benzoinalkylether; oxime compounds such as 1-phenyl-1,2-propanedione-2-(o-ethoxycarbonyl) oxime; xanthone compounds such as 2-methylthio xanthone, and 2-chlorothio xanthone; benzoin ether compounds such as benzoin ether and isobutyl benzoin ether; and radical forming compounds such as Michler's ketone and benzyl methyl ketal.

Various additives can also be added as required. For example, amines or other compounds can be added to prevent oxygen from inhibiting resin setting, and solvents can be added to improve coating properties. The solvents that can be used include but are not limited to such organic solvents as: propylene glycol monomethylether acetate, methoxymethyl propionate, ethoxyethyl propionate, ethyl lactate, ethyl pyruvate, and methyl amyl ketone.

As noted above, the masters are preferably made from silicon or quartz because of their excellent high precision etchability. In addition to their optical properties, the above-noted photosetting acrylic resins are further preferable because they can be easily separated from these silicon or quartz master materials.

Figure 1B:
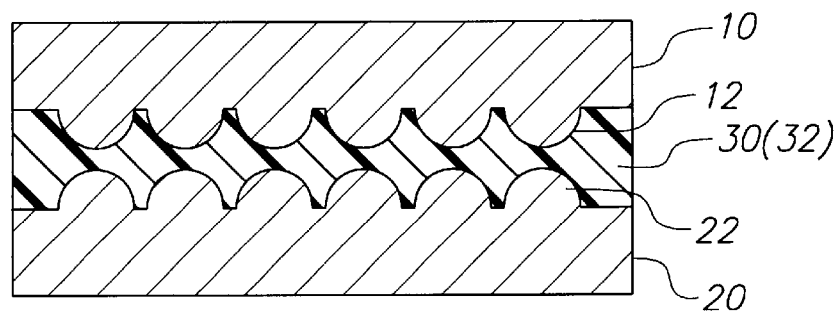

As shown in FIG. 1B, the light transmitting layer precursor 32 is then spread to cover a specific area, forming a light transmitting layer 30 between the masters 10 and 20. To spread the light transmitting layer precursor 32 to cover the specific area, a specified pressure can be applied as required to either or both the masters 10 and 20.

The light transmitting layer precursor 32 is then set by applying a setting process appropriate to the composition of the light transmitting layer precursor 32 from either or both of masters 10 and 20 to form a light transmitting layer 30 between the masters. For example, if a UV-setting acrylic resin is used as the light transmitting layer precursor 32, the precursor 32 can be set by exposure to ultraviolet light under specific conditions. Note that in this example either master 10 or 20 must be transparent to UV light.

Figure 1C:
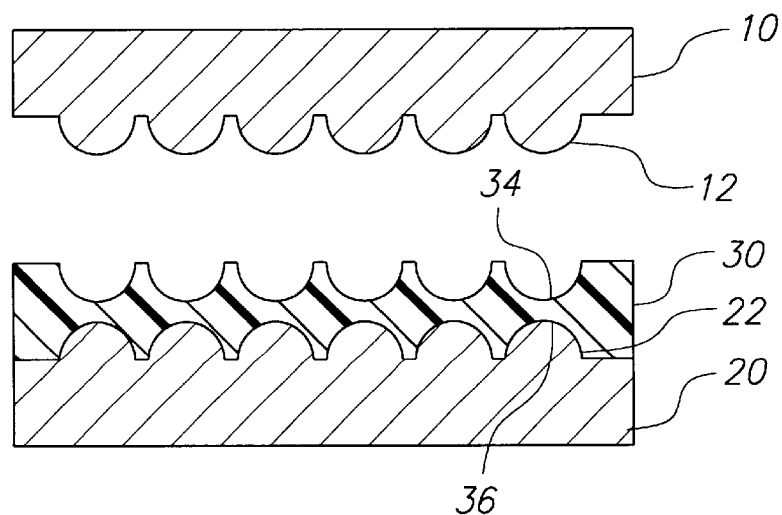

The first master 10 is then separated from the light transmitting layer 30 as shown in FIG. 1C. Note that a plurality of first lenses 34 is transferred from the first curved surfaces 12 of the first master 10 into the light transmitting layer 30. A plurality of second lenses 36 is likewise transferred from the second curved surfaces 22 of the second master 20 into the light transmitting layer 30.

By aligning the center axes of the first and second curved parts 12 and 22 before molding the light transmitting layer 30, the optical axes of the resulting first and second lenses 34 and 36 transferred therefrom are also aligned.

Figure 2A:
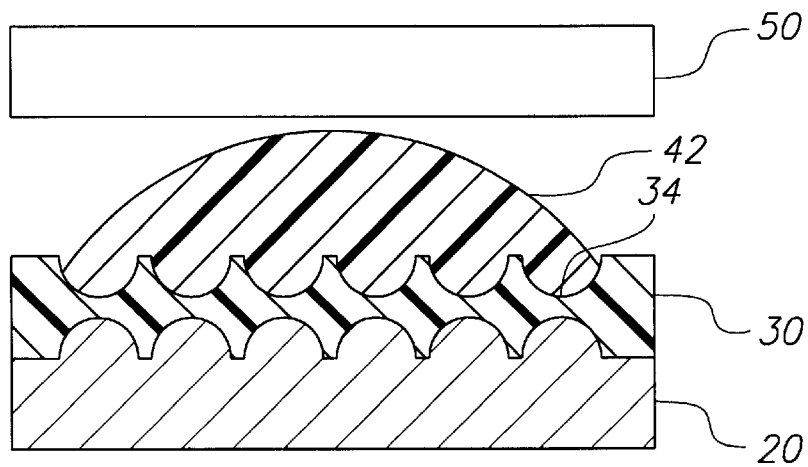
Figure 2B:
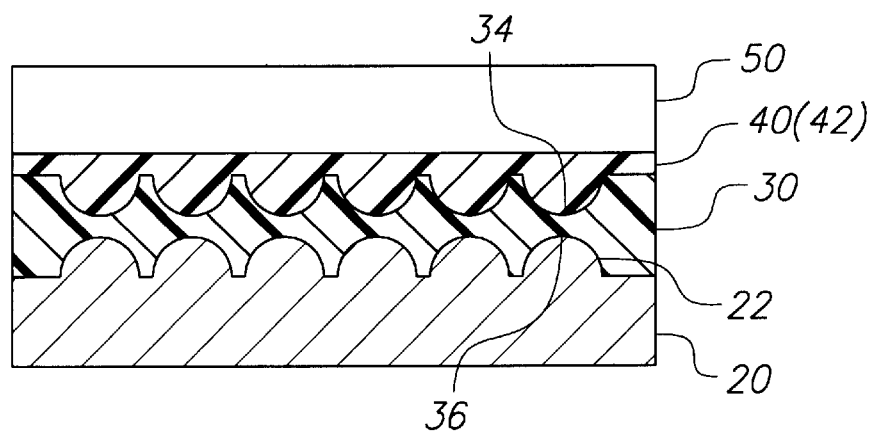

As shown in FIG. 2A, a reinforcing layer 50 is then pressed against the first light transmitting layer 30 with a second light transmitting layer precursor 42 disposed therebetween to form a second light transmitting layer 40 as shown in FIG. 2B. The reinforcing layer 50 can be pressed against the first light transmitting layer 30 using the same methods used with the first light transmitting layer precursor 32 described above. The same materials used for the first light transmitting layer precursor 32 can also be used for the second light transmitting layer precursor 42.

The reinforcing layer 50 is typically glass, but the invention shall not be so limited. More specifically, the reinforcing layer 50 can be made of any material whereby the transparency, mechanical strength, and other required physical properties can be achieved. Exemplary reinforcing layer materials include plastic plates or films of polycarbonate, polyarylate, polyether sulfone, amorphous polyolefin, polyethylene terephthalate, and polymethyl methacrylate.

A second light transmitting layer 40 is thus formed as shown in FIG. 2B by spreading the light transmitting layer precursor 42 and then setting the precursor 42 using a resin setting process appropriate to the composition of the precursor 42. If a UV-setting acrylic resin is used, for example, the precursor 42 can be set by exposure to ultraviolet light under specific conditions. Note that in this case the reinforcing layer 50 or first light transmitting layer 30 and master 20 must be of a composition enabling exposure of the precursor 42 to UV light.

Figure 2C:
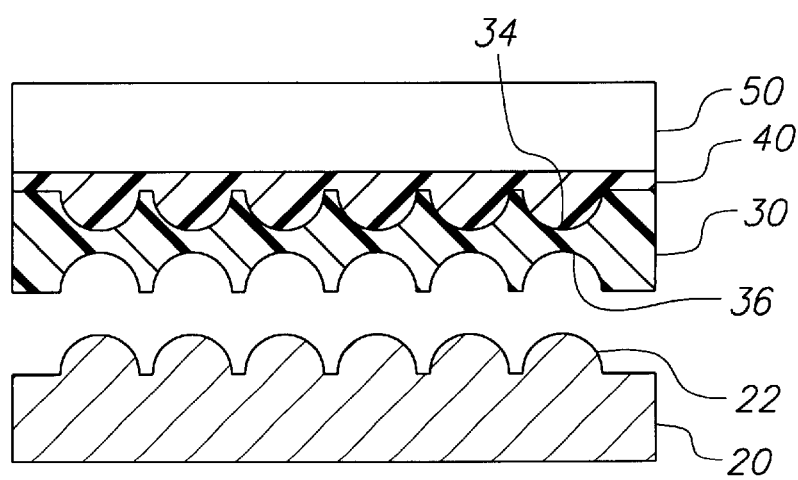

The second master 20 is then separated from the light transmitting layer 30 as shown in FIG. 2C. Note that a plurality of lenses 36 is transferred from the second curved surfaces 22 of the second master 20 into the light transmitting layer 30.

Figure 3A:
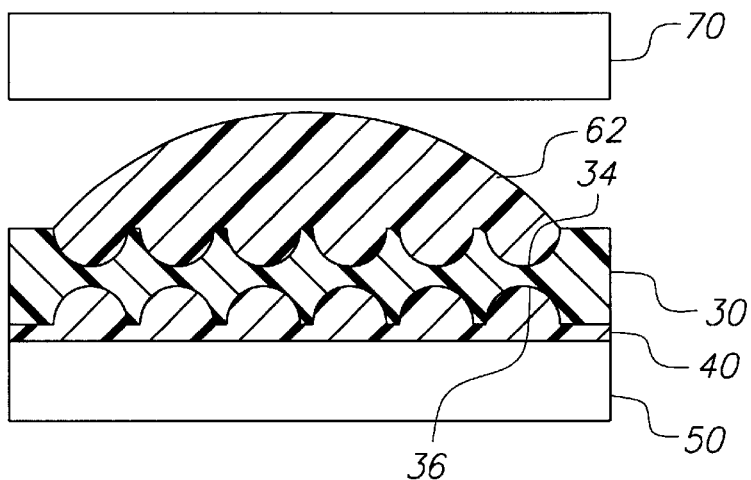
Figure 3B:
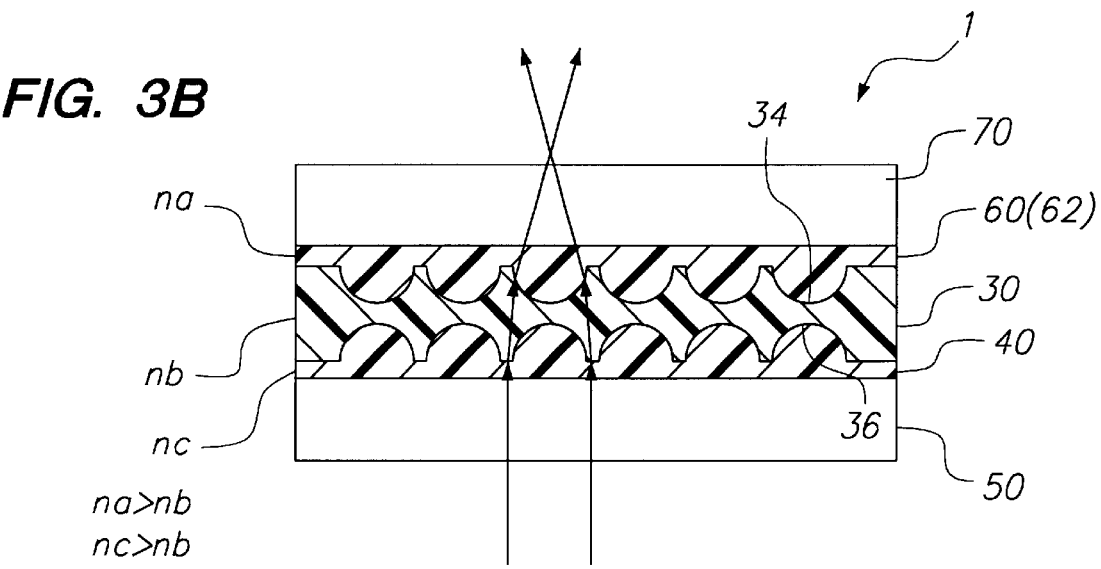

With reference to FIG. 3A, a reinforcing plate 70 and the lens surface 34 side of the light transmitting layer 30 are then pressed together with a third light transmitting layer precursor 62 disposed therebetween. The reinforcing layer 70 can be pressed against the first light transmitting layer 30 using the same methods used with the first light transmitting layer precursor 32 described above. The same materials used for the first light transmitting layer precursor 32 can also be used for the third light transmitting layer precursor 62.

This third light transmitting layer precursor 62 is then spread between the reinforcing plate 70 and light transmitting layer 30 to form a third light transmitting layer 60 and thus obtain a microlens array 1. As described above, this microlens array 1 has first to third light transmitting layers 30, 40, and 60 disposed between first and second reinforcing layers 50 and 70.

It should be noted that first lens surfaces 34 are formed on one side of the first light transmitting layer 30, and the third light transmitting layer 60 is then formed over these first lenses 34. Second lens surfaces 36 are also formed on the other side of the first light transmitting layer 30 with the second light transmitting layer 40 formed over the second lenses 36. It is thus possible to form lens surfaces 36 at the interface between the first and second light transmitting layers 30 and 40.

It will be obvious to one with ordinary skill in the related art that if the mechanical strength, gas barrier properties, chemical resistance, and other properties required for the microlens array can be achieved with the second and third light transmitting layers 40 and 60 alone, the corresponding reinforcing layers 50 and 70 can be removed. In this case, the second and third light transmitting layers 40 and 60 also function as protective films over the first light transmitting layer 30.

In addition, if the first light transmitting layer 30 alone has sufficient mechanical strength for lens surfaces 34 and 36 to perform as required as lenses, the second and third light transmitting layers 40 and 60 can also be omitted.

A light transmitting layer 30 having a plurality of lenses 34 and 36 can thus be easily produced using a simple transfer molding process with this preferred embodiment of the present invention. Material is also used very efficiently and the number of process steps can be reduced by this exemplary manufacturing method of the present invention. Production cost can therefore be reduced.

In addition, once manufactured, the first and second masters 10 and 20 can be reused multiple times insofar as their durability allows. The steps for producing the first and second masters 10 and 20 can therefore be eliminated from the manufacturing process used for second and subsequent microlens arrays. The number of steps involved with microlens array manufacture can thus be reduced, and the unit cost can therefore be further reduced compared with a conventional microlens array.

It should be further noted that by forming lenses 34 and 36 on both sides of light transmitting layer 30 in this exemplary embodiment of the present invention, light incident on the microlens array 1 is gathered twice, thus further increasing display brightness.

As described above, both lens surfaces 34 and 36 formed on the first light transmitting layer 30 are concave lenses. If light is incident upon this microlens array 1 from the lens surface 36 side of the second light transmitting layer 40, the refractive indices na, nb, and nc of the third light transmitting layer 60, first light transmitting layer 30, and second light transmitting layer 40, respectively, must be in the following relationship:

$na > nb$ $nc > nb.$

By satisfying this condition, light is incident from a medium with a high refractive index to a medium with a low refractive index at the interface between second light transmitting layer 40 and first light transmitting layer 30. Light is therefore refracted and converged from a line approximately normal to the interface between the two media. At the interface between the first light transmitting layer 30 and third light transmitting layer 60 light is also incident from a medium with a low refractive index to a medium with a high refractive index, and light is thus refracted to a line approximately normal to the interface between the two media. By thus twice collecting light, a bright screen can be achieved.

Figure 4:
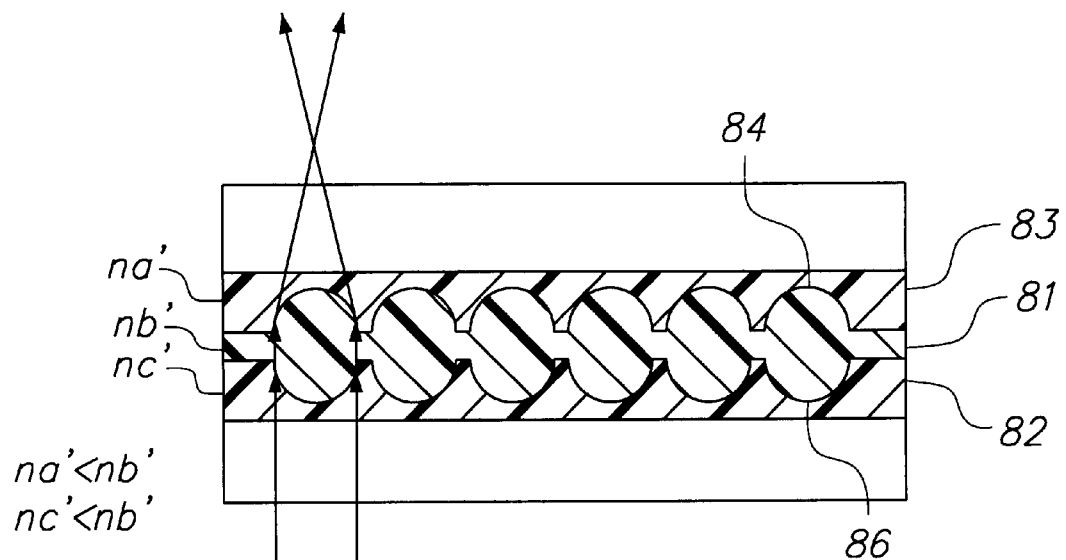
FIG. 4 shows a microlens array manufactured according to a variation of the method according to the first embodiment of the invention.

Alternatively, a microlens array having a plurality of convex lenses 84 and 86 can be formed on opposing sides of a first light transmitting layer 81 as shown in FIG. 4. In this case, when light is incident upon the microlens array from the lens surface 86 side of the second light transmitting layer 82, the refractive indices na', nb', and nc' of the third light transmitting layer 83, first light transmitting layer 81, and second light transmitting layer 82, respectively, must be in the following relationship:

$na' < nb'$ $nc' < nb'.$

By satisfying this condition, light is incident from a medium with a low refractive index to a medium with a high refractive index at the interface between second light transmitting layer 82 and first light transmitting layer 81, and light is thus refracted to a line approximately normal to the interface between the two media. In addition, light is also incident from a medium with a high refractive index to a medium with a low refractive index at the interface between the first light transmitting layer 81 and third light transmitting layer 83, and light is therefore refracted and converged from a line normal to the interface between the two media. By thus twice collecting light, a bright screen can be achieved.

Figure 5:
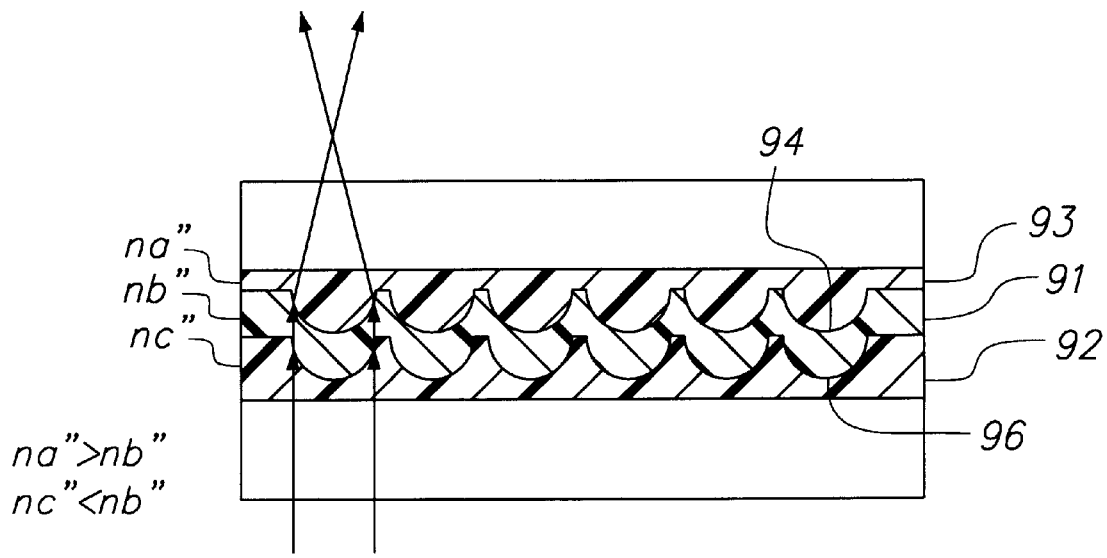
FIG. 5 shows a microlens array manufactured according to a further variation of the method according to the first embodiment of the invention.

According to a further alternative version of this exemplary embodiment of the invention, a microlens array is formed with a plurality of concave lens surfaces 94 formed on one side of a first light transmitting layer 91, and a plurality of convex lens surfaces 96 formed on the opposite side of the first light transmitting layer 91 as shown in FIG. 5. In this case, when light is incident upon the microlens array from the lens surface 96 side of the second light transmitting layer 92, the refractive indices na", nb", and nc" of the third light transmitting layer 93, first light transmitting layer 91, and second light transmitting layer 92, respectively, must be in the following relationship:

$na" > nb"$ $nc" < nb".$

By satisfying this condition, light is incident from a medium with a low refractive index to a medium with a high refractive index at the interface between second light transmitting layer 92 and first light transmitting layer 91, and light is thus refracted to a line approximately normal to the interface between the two media. In addition, light is also incident from a medium with a low refractive index to a medium with a high refractive index at the interface between the first light transmitting layer 91 and third light transmitting layer 93, and light is therefore refracted and converged to a line normal to the interface between the two media. By thus twice collecting light, a brighter screen can be achieved.

Embodiment 2

A method for manufacturing a microlens array according to a second preferred embodiment of the present invention is described next below with reference to FIG. 6A to FIG. 8B.

In this preferred embodiment of the invention a first light transmitting layer 30 having first and second lens surfaces 34 and 36 is formed on the second master 20 through the steps shown in FIGS. 1A to 1C as described above with reference to the first embodiment of the invention.

Figure 6A:
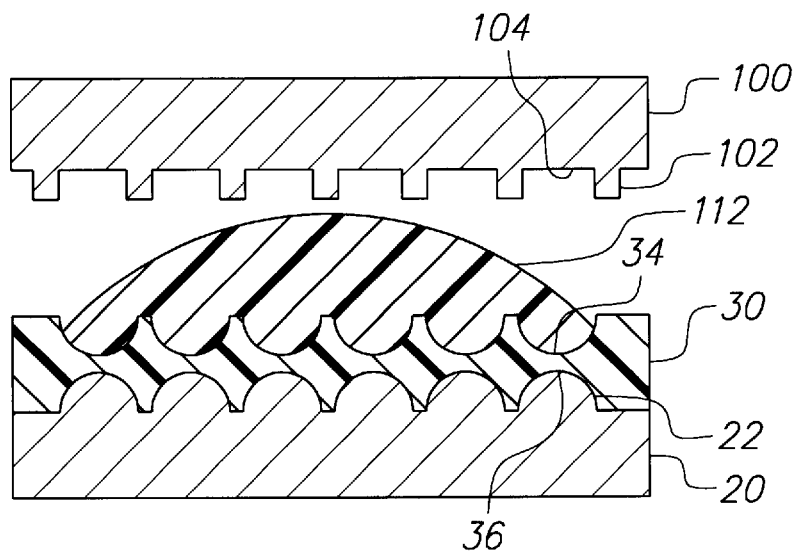
FIG. 6A to FIG. 8B show various steps in a microlens array manufacturing method according to a second preferred embodiment of the present invention.

A third master 100 as shown in FIG. 6A is then prepared with a plurality of raised parts (i.e. projections) 102 formed thereon. When seen in plan view (not shown in the figures), these raised parts 102 form a black matrix for use with a LCD panel, and delineate the areas 104 corresponding to the plurality of pixels of the display. It should be further noted that the configuration of this black matrix corresponds to the mosaic, delta, striped, or other arrangement of pixels in the display. This third master 100 can also be obtained by etching the same type of substrate used for the first or second master 10 or 20.

The first light transmitting layer 30 and the third master 100 are then placed together with the lens surface 34 side of the light transmitting layer 30 facing the raised parts 102 side of the master 100, and the areas 104 between raised parts 102 centered on the center axes of the lens surfaces 34.

The third master 100 and first light transmitting layer 30 are then pressed together with a second light transmitting layer precursor 112 disposed therebetween. This light transmitting layer precursor 112 becomes the second light transmitting layer 110 shown in FIG. 6B. The same materials used for the first light transmitting layer precursor 32 can also be used for the second light transmitting layer precursor 110. The master 100 and light transmitting layer 30 can be pressed together with the precursor 112 therebetween using the same methods used with the first light transmitting layer precursor 32 described above.

Figure 6B:
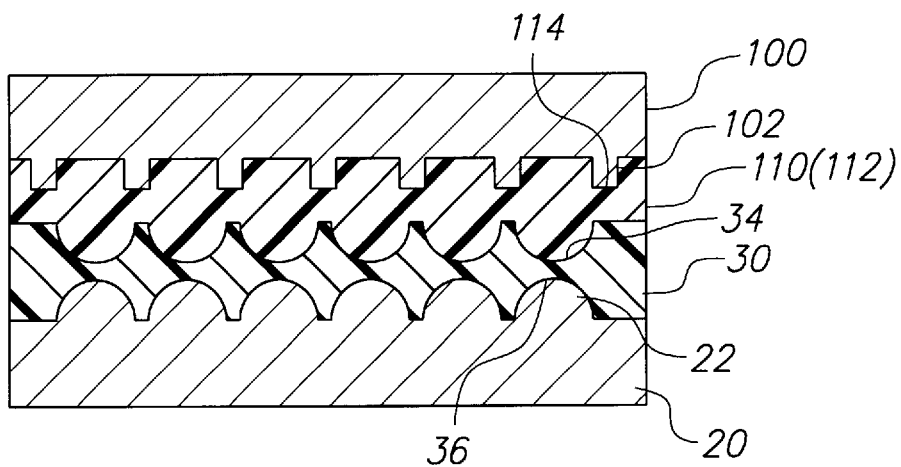

A second light transmitting layer 110 is then formed on the lens surface 34 side of the light transmitting layer 30 as shown in FIG. 6B by spreading the light transmitting layer precursor 112 over a specific area and then setting the precursor 112 using a resin setting process appropriate to the composition of the precursor 112.

In this case recesses 114 are transferred from the raised parts 102 of the third master 100 to this second light transmitting layer 110 in the surface thereof opposite of the surface facing the first light transmitting layer 30. These recesses 114 have the shape of a black matrix when seen in plan view (not shown in the figures). The recesses 114 are also formed so as to surround the center of each lens surface 34.

Figure 6C:
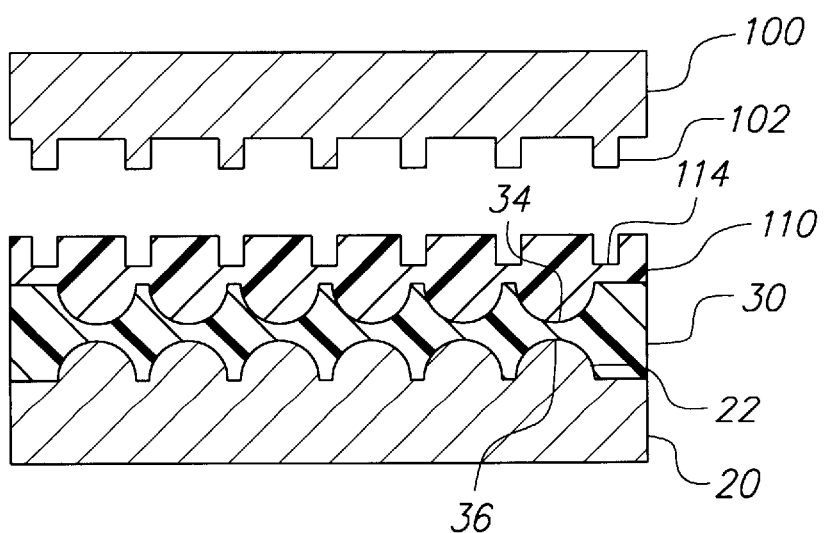

The third master 100 is then separated from the second light transmitting layer 110 as shown in FIG. 6C, thus exposing the open side of the recesses 114 transferred from the raised parts 102.

Figure 7A:
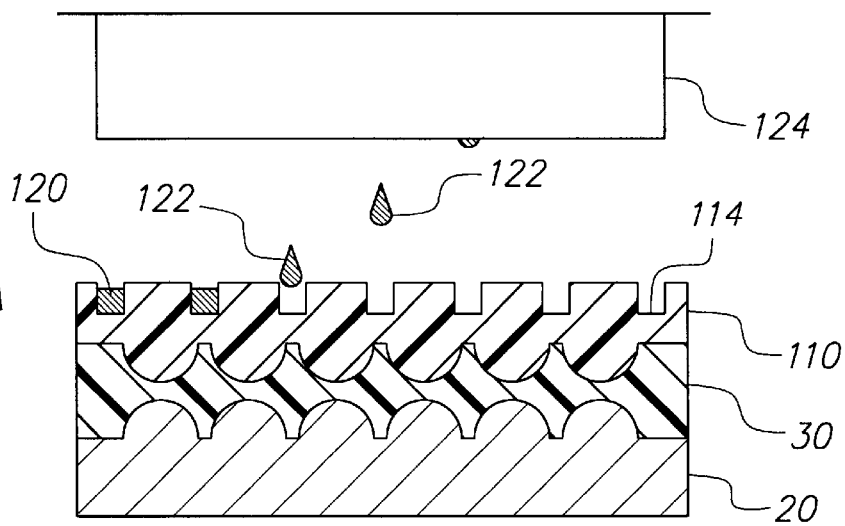
Figure 7B:
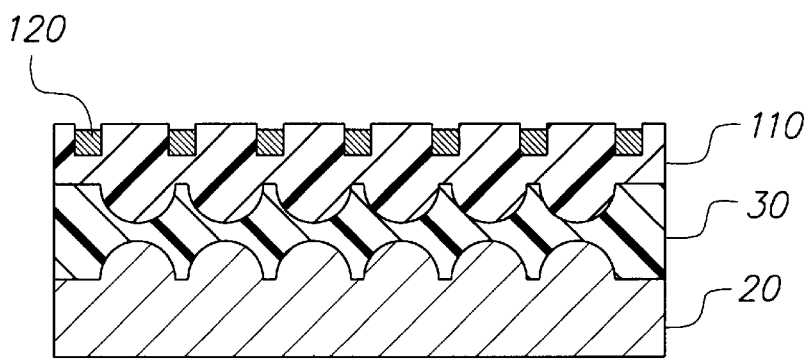

These recesses 114 are then filled with a light shield material 122 as shown in FIG. 7A to form a light shield layer 120 as shown in FIG. 7B. This light shield layer 120 forms the black matrix.

The light shield material 122 can be substantially any durable, opaque material. For example, the light shield material 122 can be a binder resin dissolved in solvent with a black dye or pigment. The solvent type is not specifically limited, and can be water or a variety of organic solvents.

Exemplary organic solvents include: propylene glycol monomethylether acetate, propylene glycol monopropylether, methoxymethyl propionate, ethoxyethyl propionate, ethyl cellusolve, ethyl cellusolve acetate, ethyl lactate, ethyl pyruvate, methyl amyl ketone, cyclohexanone, xylene, toluene, butyl acetate. These solvents can further be used singly or in mixtures thereof.

The light shield recesses 114 can be filled with light shield material 122 using various methods, but an ink jet type method is preferable. Ink jet spray methods have been proven in ink jet printers, and enable the light shield recesses 38 to be filled quickly, economically, and without waste.

When filling the light shield material 122 into the recesses, the ink jet head 124 is positioned and driven appropriately to fill each recess 114 in the light transmitting layer 110 with a specific amount of material 122. Filling of the light shield recesses 114 is completed when the light shield material 122 has been filled uniformly into the recesses 114.

When the light shield material 122 contains solvent, the solvent is removed by heat treatment. Removing the solvent, however, causes the light shield material 122 to shrink. It is therefore necessary to fill the recesses with enough material 122 so that the thickness needed to assure the required opacity remains after solvent evaporation and material shrinkage.

Figure 7C:
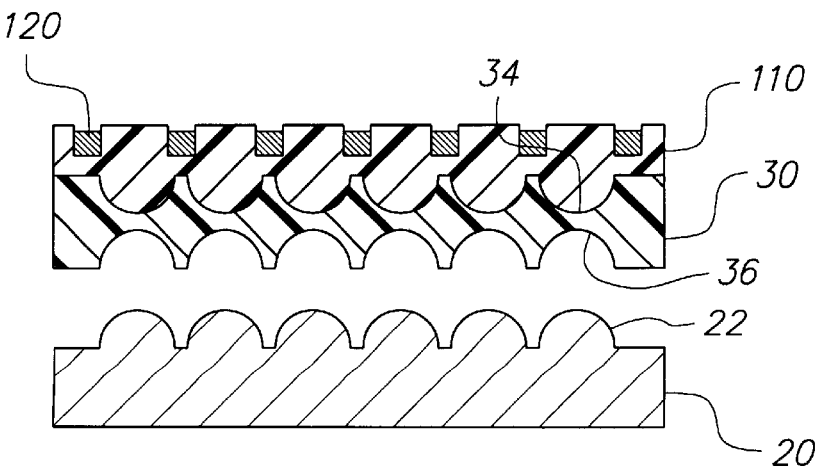

The second master 20 is then separated from the first light transmitting layer 30 as shown in FIG. 7C. A plurality of lens surfaces 36 is formed in this first light transmitting layer 30 by a simple transfer process from the curved surfaces 22 in the second master 20.

Figure 8A:
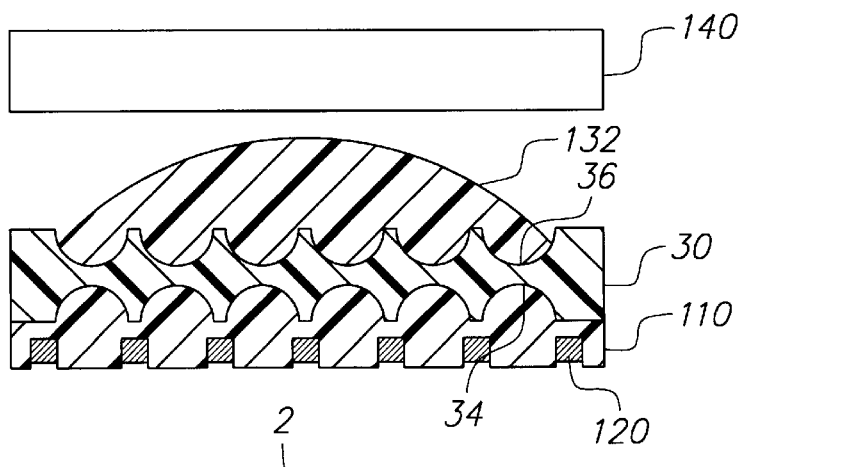
Figure 8B:
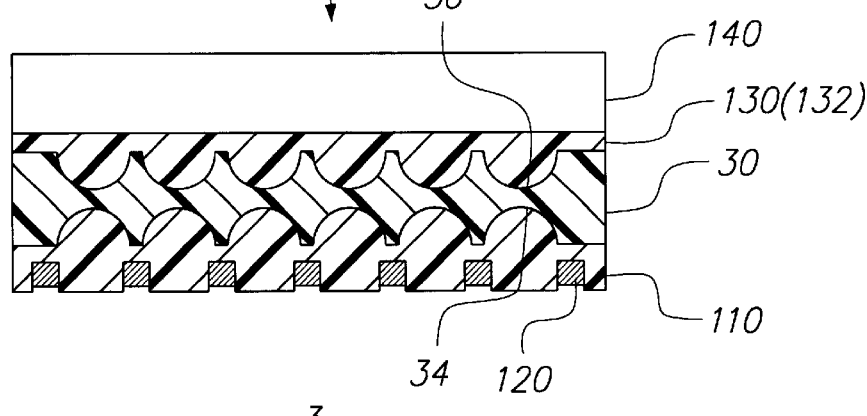

A reinforcing plate 140 and the lens surface 36 side of the light transmitting layer 30 are then pressed together with a third light transmitting layer precursor 132 disposed therebetween as shown in FIG. 8A to form a third light transmitting layer 130 as shown in FIG. 8B. These steps can be accomplished as described above with reference to FIGS. 2A and 2B.

A microlens array 2 as shown in FIG. 8B can thus be manufactured.

It will be obvious to one with ordinary skill in the related art that if the mechanical strength, gas barrier properties, chemical resistance, and other properties required for the microlens array can be achieved with the third light transmitting layer 130, the reinforcing layer 140 can be removed. In addition, if the first light transmitting layer 30 alone has sufficient mechanical strength for lens surfaces 36 to perform as required as lenses, the third light transmitting layer 130 can also be omitted. Further alternatively, a fourth light transmitting layer can be formed from a fourth light transmitting layer precursor over the surface of the light shield layer 120 in the second light transmitting layer 110, and a reinforcing layer provided over this fourth light transmitting layer.

The light shield layer 120 in a microlens array 2 according to this preferred embodiment of the present invention forms a black matrix enabling contrast between pixels to be improved. Other effects and benefits of this exemplary embodiment of the invention are the same as those of the first embodiment described above.

Embodiment 3

A method for manufacturing a microlens array according to a third preferred embodiment of the present invention is described next below with reference to FIG. 9A to FIG. 11.

In this preferred embodiment of the invention a first light transmitting layer 30 having first and second lens surfaces 34 and 36 is formed on the second master 20 through the steps shown in FIGS. 1A to 1C as described above with reference to the first embodiment of the invention.

Figure 9A:
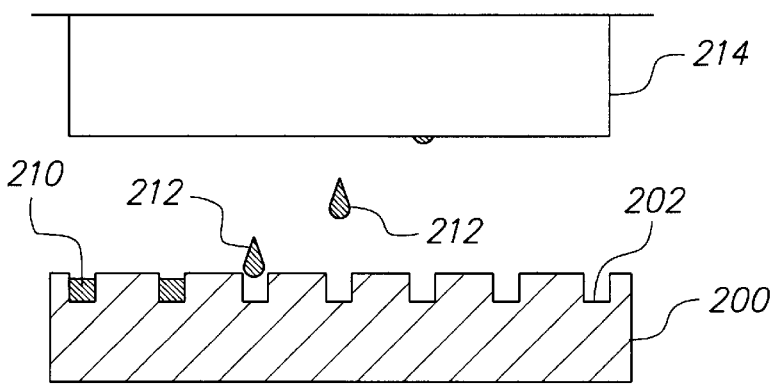

A third master 200 as shown in FIG. 9A is then prepared with a plurality of recessed parts 202 formed thereon. When seen in plan view (not shown in the figures), these recessed parts 202 form a black matrix for use with a LCD panel, and delineate the areas corresponding to the plurality of pixels of the display. It should be further noted that the configuration of this black matrix corresponds to the mosaic, delta, striped, or other pixel arrangement. This third master 200 can also be obtained by etching the surface of a substrate. The third master 200 can therefore be made of any etchable material, but is preferably silicon or quartz because of the ease with which high precision recessed parts 202 can be etched in such materials.

These recessed parts 202 are then filled with a light shield material 212 as shown in FIG. 9A to form a light shield layer 210. This light shield layer 210 forms the black matrix.

This light shield material 212 can be any material used as the light shield material 122 in the above second embodiment. The light shield material 212 can also be filled into the recessed parts 202 using an ink jet head 214 as described above. This method of filling the recesses can also be as described in the above second embodiment.

Figure 9B:
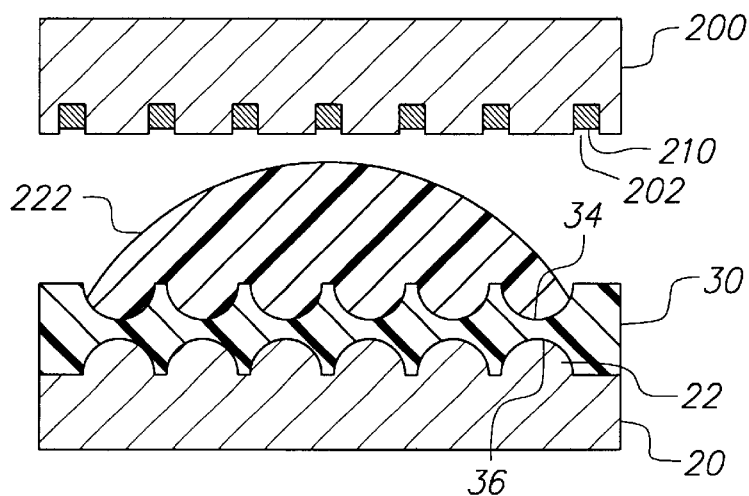

The third master 200 and lens surface 34 side of the first light transmitting layer 30 are then pressed together with a second light transmitting layer precursor 222 disposed therebetween as shown in FIG. 9B. The third master 200 and light transmitting layer 30 are aligned so that the center of each lens surface 34 is surrounded by recesses 202. It should be noted that while the third master 200 is shown on top in FIG. 9B the invention shall not be so limited as it will be obvious that the third master 200 can be alternatively placed on the bottom.

The same materials used for the first light transmitting layer precursor 32 in the first embodiment can also be used for this second light transmitting layer precursor 222. The master 200 and light transmitting layer 30 can also be pressed together with the precursor 222 therebetween using the same methods used with the first light transmitting layer precursor 32 described above.

Figure 9C:
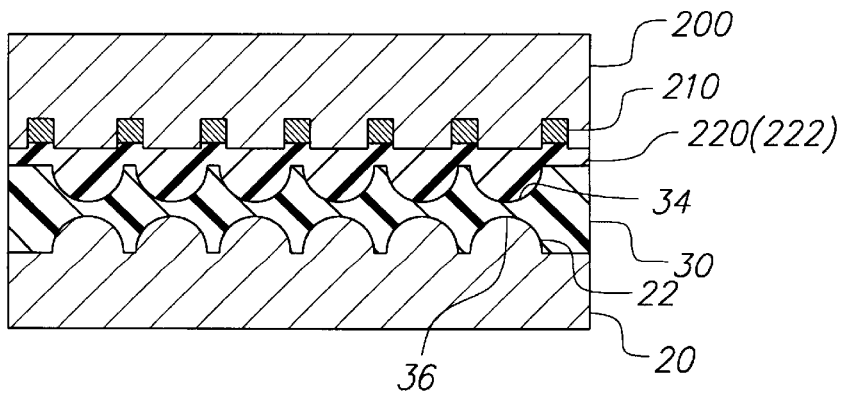

A second light transmitting layer 220 is then formed as shown in FIG. 9C by spreading the second precursor 222 over a specific area and then setting the precursor 222 using a resin setting process appropriate to the composition of the precursor 222.

Figure 10A:
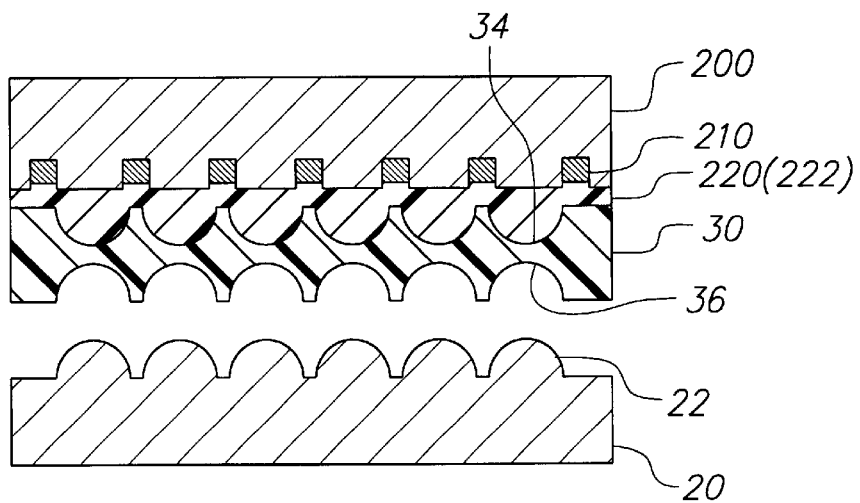

The second master 20 is then separated from the first light transmitting layer 30 as shown in FIG. 10A. The curved surfaces 22 of the second master 20 are transferred to the first light transmitting layer 30, thus forming a plurality of lens surfaces 36.

Figure 10B:
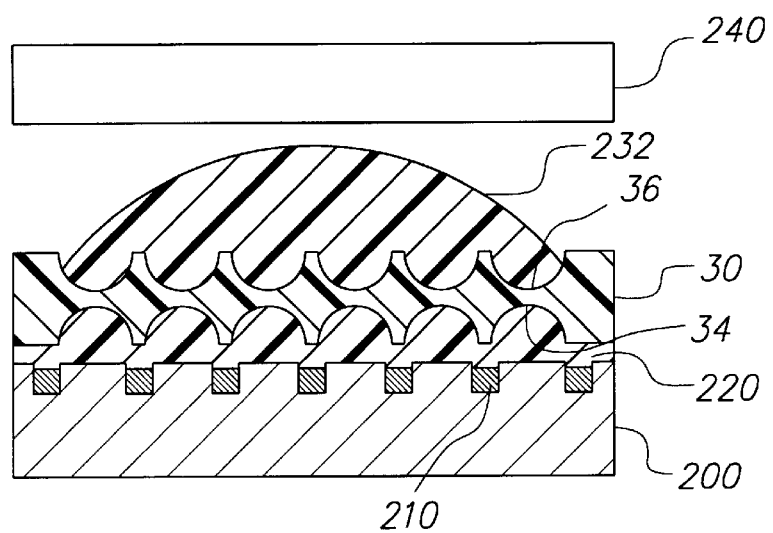
Figure 10C:
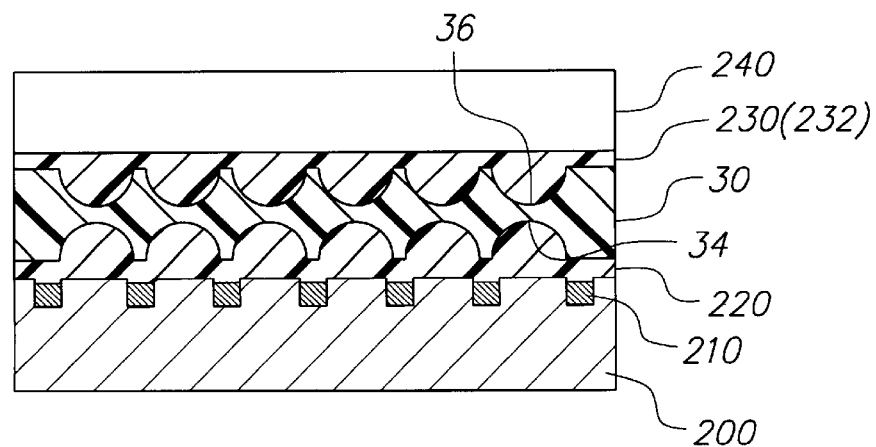

A reinforcing plate 240 and the lens surface 36 side of the light transmitting layer 30 are then pressed together with a third light transmitting layer precursor 232 disposed therebetween as shown in FIG. 10B to form a third light transmitting layer 230 as shown in FIG. 10C. These steps can be accomplished as described above with reference to FIGS. 2A and 2B.

Figure 11:
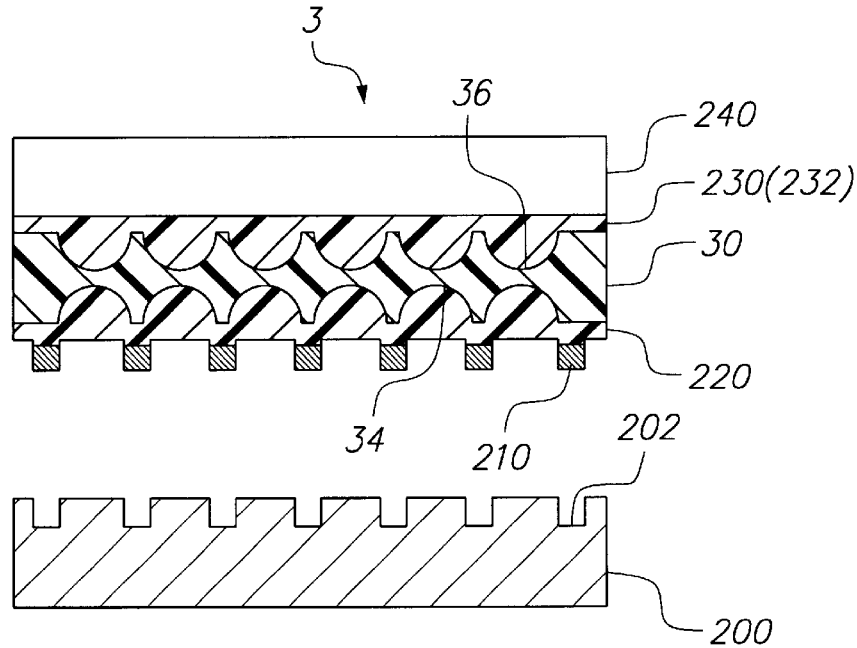
FIG. 9A to FIG. 11 show various steps in a microlens array manufacturing method according to a third preferred embodiment of the present invention.

The third master 200 is then separated from the second light transmitting layer 220 as shown in FIG. 11. It should be noted that the light shield layer 210 is also separated with the second light transmitting layer 220 from the recesses 202 of the third master 200.

A microlens array 3 as shown in FIG. 11 can thus be manufactured. This microlens array 3 has a light shield layer 210 on the second light transmitting layer 220.

It will be obvious to one with ordinary skill in the related art that if the mechanical strength, gas barrier properties, chemical resistance, and other properties required for the microlens array can be achieved with the third light transmitting layer 230, the reinforcing layer 240 can be removed. In addition, if the first light transmitting layer 30 alone has sufficient mechanical strength for lens surfaces 36 to perform as required as lenses, the third light transmitting layer 230 can also be omitted. Further alternatively, a fourth light transmitting layer can be formed from a fourth light transmitting layer precursor over the surface of the light shield layer 210 in the second light transmitting layer 220, and a reinforcing layer provided over this fourth light transmitting layer.

The light shield layer 210 in a microlens array 3 according to this preferred embodiment of the present invention forms a black matrix enabling contrast between pixels to be improved. Other effects and benefits of this exemplary embodiment of the invention are the same as those of the first embodiment described above.

Figure 12:
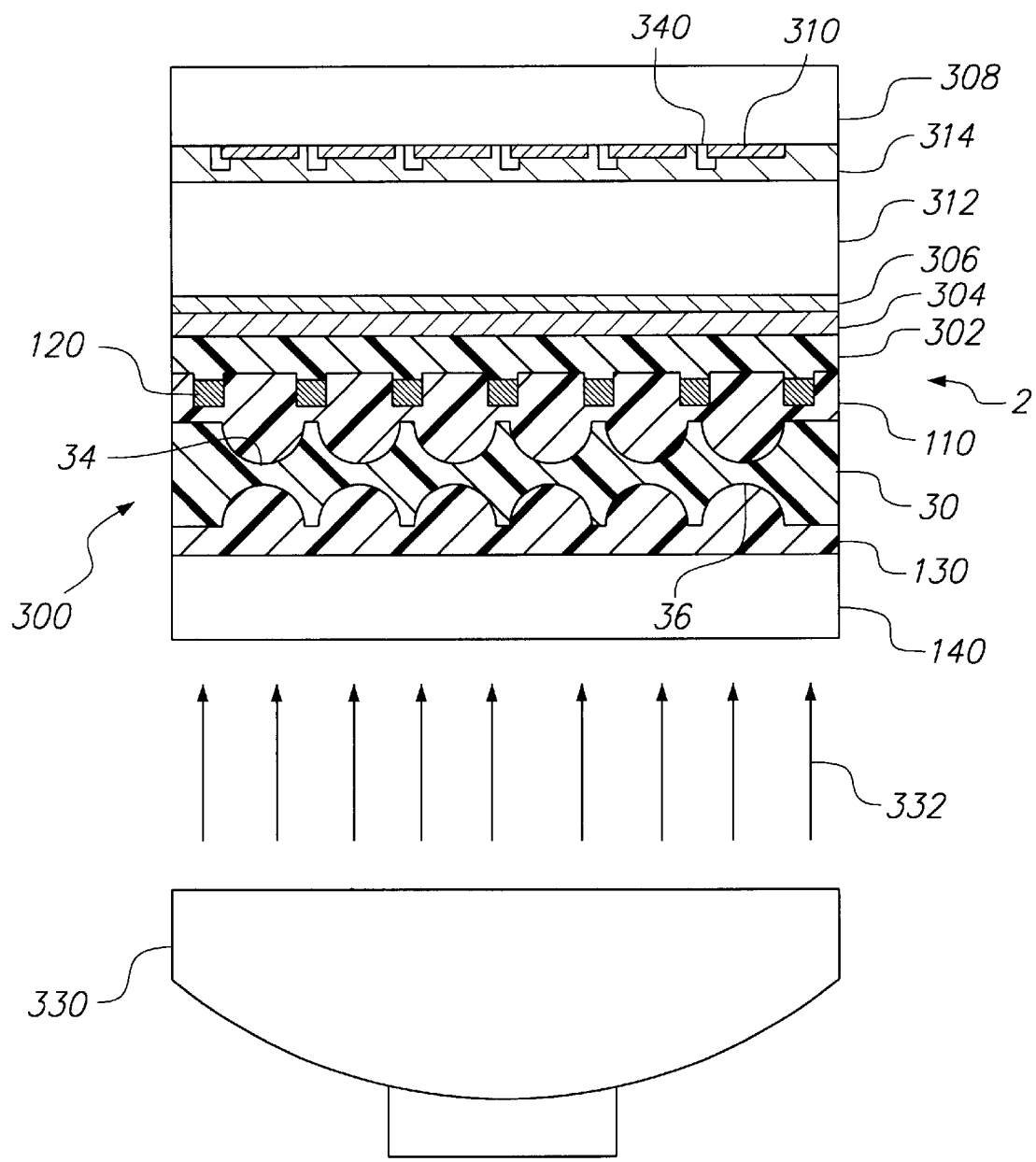
FIG. 12 shows an electronic device comprising a microlens array manufactured using a method according to a preferred embodiment of the present invention.

FIG. 12 shows part of an LCD projector using a microlens array 2 according to the present invention. More specifically, the light valve 300 of this LCD projector comprises a microlens array 2 manufactured using a method according to the above second embodiment of the invention. Lamp 330 is the light source.

The surface of the microlens array 2 in which the lenses 36 of the light transmitting layer are formed is positioned facing the lamp 330. A fourth light transmitting layer 302 is formed to the light shield layer 120 side of the second light transmitting layer 110. A common electrode 304 and orientation film 306 are laminated over this fourth light transmitting layer.

A TFT layer 308 is disposed to the light valve 300 with a gap between the TFT layer 308 and orientation film 306. The TFT layer 308 comprises transparent individual electrodes 310 and TFT 340 covered by an orientation film 314. The TFT layer 308 is disposed with the orientation film 314 opposite orientation film 306.

Liquid crystal 312 is sealed between orientation films 306 and 314, and is driven by a voltage controlled by the TFT 340.

With an LCD projector thus comprised, light 332 emitted from the lamp 330 is gathered twice by the lenses 36 and 34 onto a single pixel, thereby achieving a bright display. The light shield layer 120 also functions as a black matrix so that contrast between pixels can be improved.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method of manufacturing a microlens array, comprising:

pressing together, with a first light transmitting layer precursor disposed therebetween, a first master having a plurality of first curved surfaces and a second master having a plurality of second curved surfaces to form a first light transmitting layer having on both sides thereof a plurality of lens surfaces formed in the first light transmitting layer precursor by said first and second curved surfaces.

2. The microlens array manufacturing method as set forth in claim 1, further comprising, prior to said step of pressing together:

positioning said first and second masters with respect to each other such that a center axis of each of said first curved surfaces is aligned with a center axis of a respective one of said second curved surfaces.

3. The microlens array manufacturing method as set forth in claim 2, further comprising:

forming a second light transmitting layer from a second light transmitting layer precursor on at least one side of said first light transmitting layer.

4. The microlens array manufacturing method as set forth in claim 3, wherein said step of forming said second light transmitting layer comprises compressing said second light transmitting layer precursor between said first light transmitting layer and a third master having a plurality of raised parts to form a plurality of recessed parts in said second light transmitting layer from said raised parts; and said microlens array manufacturing method further comprising:

separating said third master from the second light transmitting layer; and filling said recessed parts in said second light transmitting layer with a light shield material to form a light shield layer.

5. The microlens array manufacturing method as set forth in claim 4, further comprising, prior to said step of forming said second light transmitting layer:

aligning said third master with said first light transmitting layer such that a center axis of each said lens surface formed in said first light transmitting layer is surrounded by a respective one of said raised parts of said third master.

6. The microlens array manufacturing method as set forth in claim 3, further comprising:

filling a light shield material in recessed parts of a third master to form a light shield layer; and said step of forming a second light transmitting layer comprises compressing said second light transmitting layer precursor between said first light transmitting layer and said third master filled with said light shield material; and separating said third master from the said light shield layer and said second light transmitting layer.

7. The microlens array manufacturing method as set forth in claim 6, further comprising, prior to said step of forming said second light transmitting layer:

aligning said third master with said first light transmitting layer such that a center axis of each said lens surface formed in said first light transmitting layer is surrounded by a respective one of said recessed parts of said third master.

8. The microlens array manufacturing method as set forth in claim 6, wherein said step of filling a light shield material in recessed parts comprises ink jet spraying of said light shield material.

9. The microlens array manufacturing method as set forth in claim 6, further comprising forming a third light transmitting layer on said light shield layer.

10. A microlens array manufactured according to the method of claim 6.

11. A microlens array comprising a first light transmitting layer having a plurality of first lens surfaces formed on one side thereof, and a plurality of second lens surfaces formed on another side thereof, each of said plurality of second lens surfaces aligned with an optical axis of a respective one of said first lens surfaces, said first light transmitting layer comprising an energy setting resin selected from the group consisting of acrylic resins, epoxy resins, melamine resins, and polyimide resins, and further comprising a second light transmitting layer on at least one surface of said first light transmitting layer.

12. The microlens array as set forth in claim 11, further comprising a light shield layer formed on at least one side of said first light transmitting layer and surrounding a center axis of each lens surface.

13. A display apparatus comprising:

a microlens array comprising a first light transmitting layer having a plurality of first lens surfaces formed on one side thereof, and a plurality of second lens surfaces formed on another side thereof, each of said plurality of second lens surfaces aligned with an optical axis of a respective one of said first lens surfaces, said first light transmitting layer comprising an energy setting resin selected from the group consisting of acrylic resins, epoxy resins, melamine resins, and polyimide resins; and a light source for emitting light to said microlens array, and wherein said microlens array further comprises a second light transmitting layer on at least one surface of said first light transmitting layer.

14. The display apparatus as set forth in claim 13, wherein said microlens array further comprises a light shield layer formed on at least one side of said first light transmitting layer and surrounding a center axis of each lens surface.

* * * * *